United States Patent [19]

Freedman et al.

[11] 4,167,382
[45] Sep. 11, 1979

[54] APPARATUS FOR ROTO-MOLDING

[75] Inventors: Frank J. Freedman, Penfield; Warren D. Fishbaugh, Rochester, both of N.Y.

[73] Assignee: Sybron Corporation, Rochester, N.Y.

[21] Appl. No.: 914,498

[22] Filed: Jun. 12, 1978

[51] Int. Cl.² .................... B29C 5/04; B29D 9/08
[52] U.S. Cl. ........................... 425/256; 249/105; 425/427; 425/435; 264/310; 264/311
[58] Field of Search ............. 249/105; 425/115, 256, 425/429, 435, 90, 405 H; 264/255, 270, 269, 310, 311

[56] References Cited

U.S. PATENT DOCUMENTS

| | | | |
|---|---|---|---|
| 2,290,910 | 7/1942 | Jeffery | 425/405 H X |
| 3,017,670 | 1/1962 | Ziveig | 264/255 |
| 3,202,745 | 8/1965 | Ringdal | 425/435 X |
| 3,239,591 | 3/1966 | Wendt | 425/405 H X |
| 3,451,101 | 6/1969 | Bowles | 425/405 H X |
| 3,474,165 | 10/1969 | Rakes et al. | 425/90 X |
| 3,477,096 | 11/1969 | Bowles et al. | 425/405 H |
| 3,673,296 | 6/1972 | Timko | 264/310 X |
| 3,788,916 | 1/1974 | Gadelius | 264/270 X |
| 3,885,016 | 5/1975 | Pivar | 264/269 |
| 3,900,640 | 8/1975 | Vecchiotti | 264/310 X |
| 3,981,955 | 9/1976 | Otani et al. | 264/255 |

Primary Examiner—J. Howard Flint, Jr.
Attorney, Agent, or Firm—Theodore B. Roessel; Roger Aceto

[57] ABSTRACT

Disclosed is apparatus for roto-molding, multi-layered plastic containers and the like.

9 Claims, 4 Drawing Figures

APPARATUS FOR ROTO-MOLDING

BACKGROUND OF THE INVENTION

The present invention relates to roto-molding plastic containers and more specifically to the roto-molding of multi-layered plastic containers.

Roto-molding is well-known in the art and U.S. Pat. No. 3,885,016 generally describes the roto-molding process. Briefly roto-molding is a process used to fabricate plastic vessels, such as cylindrical tanks, rectangular tanks and other hollow forms and the like. In roto-molding a predetermined amount of powdered thermoplastic material, such as polyethylene is loaded into a mold. The mold is closed and placed into an oven where it is simultaneously rotated about two axes. As the thermoplastic material melts and the mold is rotated, the plastic coats the interior of the mold to form a seamless homogeneous structure with a uniform wall thickness. The mold is then moved out of the furnace and into a cooling chamber to solidify the plastic, after which the molded plastic container is removed.

One typical roto-molding arrangement has three horizontal arms extending outward from a central journal to form a generally Y-shaped arrangement. One roto-mold is then mounted at the end of each arm. This provides a three-station manufacturing process wherein one station has an oven, the second a cooling chamber and the third a loading position. With such an installation, the three arms are simply rotated about the central journal to move one of the molds progressively from a loading station where the mold is charged with powdered resin, to the furnace where the mold is heated and simultaneously rotated about two axes to form the container, to the cooling chamber where a water spray is directed at the mold to speed the cooling cycle. The mold is then moved back to the load station where the completed container is stripped from the mold and another charge of resin is introduced into the mold.

It is well-known that some thermoplastic resins have better corrosion and abrasion resistance than others. However, such resins are usually more expensive, so that containers roto-molded entirely of the more chemical or abrasion resistant resin is considerably more expensive than the same container molded from a resin which is less corrosion or abrasion resistant. A good compromise between these two situations is to provide a container having a laminated structure wherein the less expensive, less resistant material forms a substrate with the more expensive, more resistant material being the topmost layer.

The present invention provides a method and apparatus for roto-molding multi-layered containers by introducing separate charges of powdered resin into the mold while the mold is in the oven. This permits the formation of a multi-layered product without the need for removing the mold from the oven and disrupting the heating cycle.

SUMMARY OF THE INVENTION

The present invention may be characterized in one aspect thereof by the provision of an insulated dispenser attached to the mold, the dispenser containing one or more charges of powdered resin in separate compartments. The resin in each of the compartments can be selectively discharged into the mold by operation of a sliding gate. With this arrangement, a first charge of powdered resin can be placed directly into the mold and the mold heated and rotated to form a base layer. While the mold is in the oven, the insulated dispenser prevents the other charges of resin from melting. At the appropriate time, the gate of the dispenser is operated so that an additional charge of a different powdered resin is introduced into the mold. Further heating and rotating of the mold causes the second charge to form a layer over and bonded to the first. This procedure can be repeated until all charges have been introduced into the mold and a multi-layered container is formed. The mold is then removed from the oven and to the cooling station.

DESCRIPTION OF THE PREFERRED EMBODIMENTS

Figure 1:
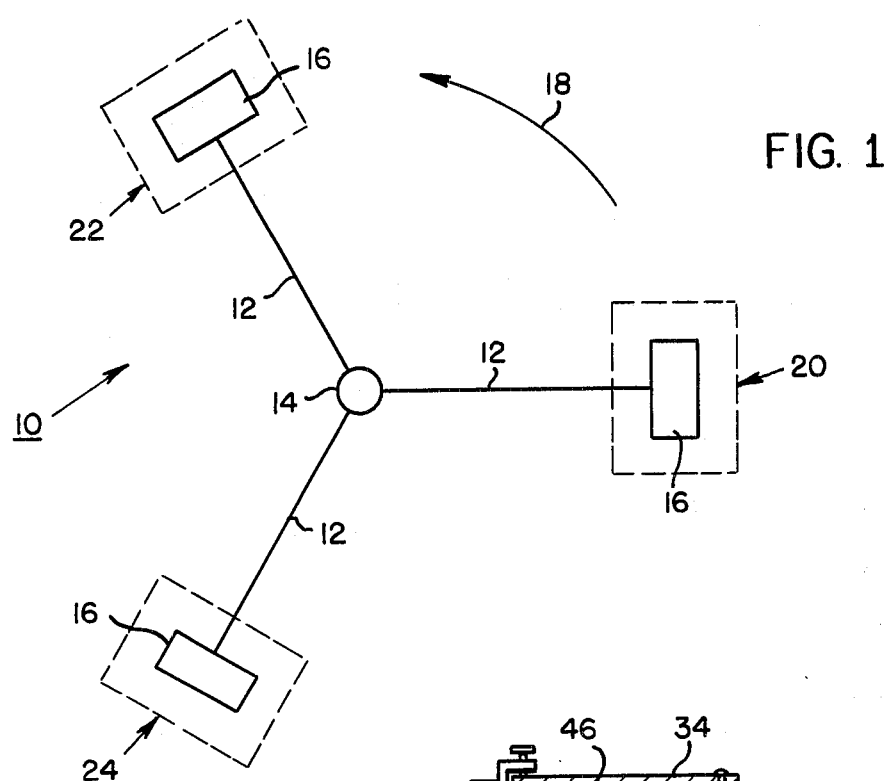
FIG. 1 is a schematic representation in plan view of a typical roto-molding operation.

Referring to the drawings, FIG. 1 shows schematically in plan view a typical roto-molding operation generally indicated at 10. The arrangement includes three horizontally oriented arms 12 extending outward from a central hub 14 in a generally Y-shaped configuration. The actual roto-molds 16 are carried on the outward end of each arm. With this arrangement, the Y-shaped arms can be rotated in the direction shown by arrow 18 to move the individual molds 16 in succession from a load station 20 to a heating station 22, to a cooling station 24 and then back to load station 20. At the load station 20, a charge of powdered resin is placed into a mold. At the heating station or oven 22 the mold is heated and rotated about two axes so that the powdered resin will fuse and coat the interior surface of the mold. At the cooling station 24 any suitable means, such as an air or water spray is used to cool the mold and then, when moved back to the loading station 20, the finished plastic container is stripped from the mold and a new charge of powdered resin placed into the mold.

Figure 2:
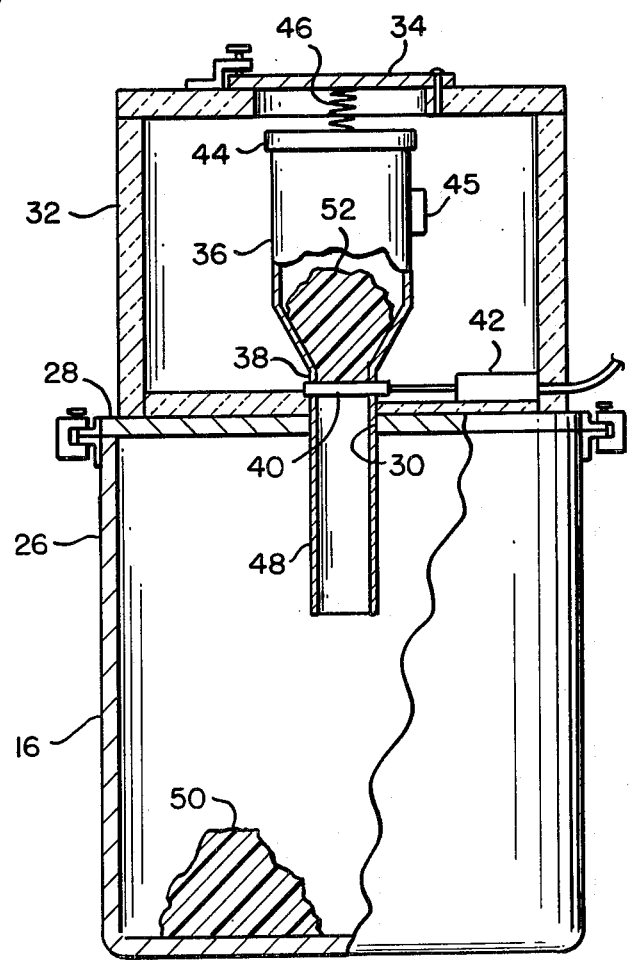
FIG. 2 is an elevation view partly in section and broken away showing a roto-mold incorporating a dispenser unit of the present invention.

A mold 16 modified so as to be capable of molding a multi-layered container is shown in FIG. 2. This mold includes a standard body portion 26 of a heat conducting material, the body having a removable cover 28. In this case, however, cover 28 has an opening 30 therethrough for purposes set out hereinbelow.

Mounted to the top of cover 28 is a heavily insulated compartment 32. Access into the compartment is provided by a door member 34. Within the compartment is a dispenser 36. This dispenser has a neck portion 38 for discharging the contents of the dispenser into mold body 26 through opening 30. A slide gate 40 of any suitable material such as Teflon is located in neck 38 to seal off dispenser 36 from mold body 26. An air cylinder 42 located within the insulated chamber is operatively connected to slide gate 40 for opening the gate at the appropriate time and discharging the contents of dispenser 36 into mold body 26.

The dispenser 36 is provided with a removable lid 44 which is held into position by a spring 46 biased between the lid 44 and the cover 34. The action of spring 46 acts to keep the lid 44 on the dispenser as the entire roto-mold is rotated about two different axes during the roto-molding process.

Completing the structure is a Teflon tube member 48 which extends into the mold from about the opening 30. The purpose of this tube is to prevent the molten resins from sealing over opening 30 during the roto-molding process. Also if desired an air vibrator 45 may be attached to dispenser 36 for purposes set out hereinbelow.

In operation, a measured quantity of a powdered resin 50 is introduced into the mold body 26, while the roto-mold is at the load station 20 as shown in FIG. 1. The mold cover, including the insulated compartment 32 is then mounted to the mold body 26 by any suitable means such as clamps or other locking arrangement. The compartment cover 34 is then open so that dispenser lid 44 can be removed and the dispenser 36 filled with a measured amount of powdered resin indicated at 52.

It should be appreciated that both resins 50 and 52 may be of a similar type, however, in the usual case, resin 50 would form the substrate of the laminated container and would be the less expensive resin, such as conventional polyethylene or the like. Resin 52, then, would be the more expensive resin having greater chemical resistance and abrasion resistance than resin 50. Examples of such a resin would be a cross-linked linear polyethylene or an ethylene-chlorotrifluoroethylene. The entire roto-mold 16 is then moved from the load station 20 into a heating station or oven 22. While in the oven, the mold is heated between 400°-800° F. and simultaneously rotated about two axes. This causes the powdered resin 50 to distribute over the surface of the mold while heat, conducted through the walls of the mold body 26, causes the resin charge 50 to fuse. Compartment 32, however, is sufficiently insulated so as to prevent the fusing of the resin charge 52 within dispenser 36.

After an appropriate time interval sufficient to permit resin 50 to form a substrate lining the interior surface of mold body 26, rotation of mold 16 is stopped and the mold brought to the upright position as shown in FIG. 2. Cylinder 42 is then activated to remove the obstructing slide gate 40 from dispenser neck 38. This allows the resin charge 52 to fall by gravity through opening 30 and into mold body 26. At this point the air vibrator 45 may be activated to shake the dispenser so as to insure that all the powdered resin charge 52 is discharged into the mold body 26. The gate is then closed and the mold rotated as before until resin 52 fuses and forms a layer on top of the substrate layer previously formed by resin 50. After a suitable interval in oven 22, the entire mold 16 is indexed first to station 24 where it is cooled and then to the load station 20 where the mold is opened and the plastic container stripped from mold body 26.

Figure 4:
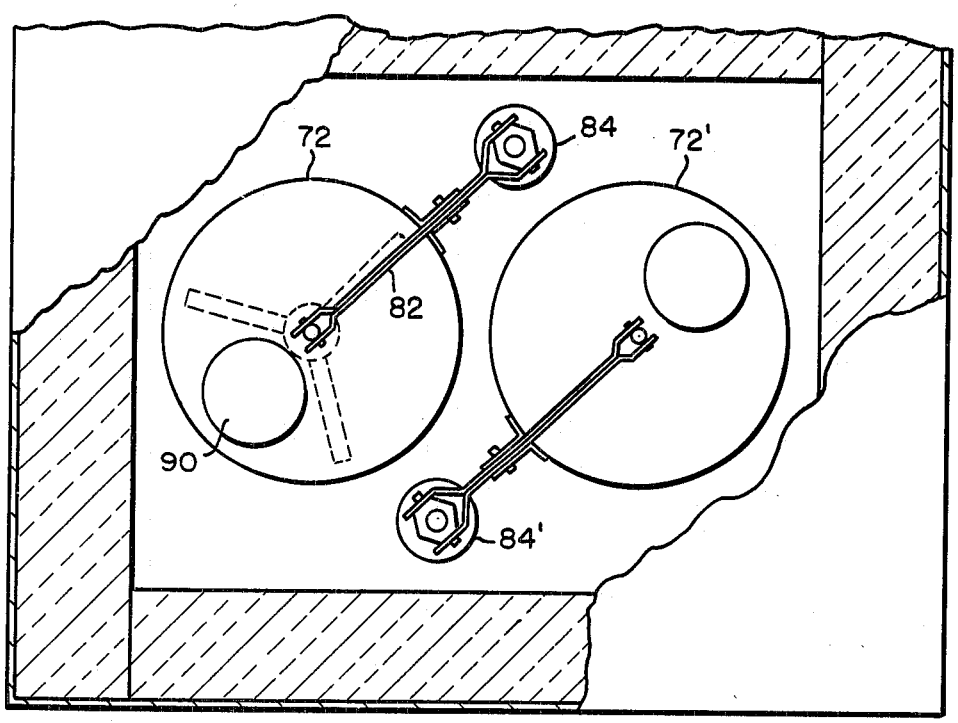
FIG. 4 is a plan view of FIG. 3.
Figure 3:
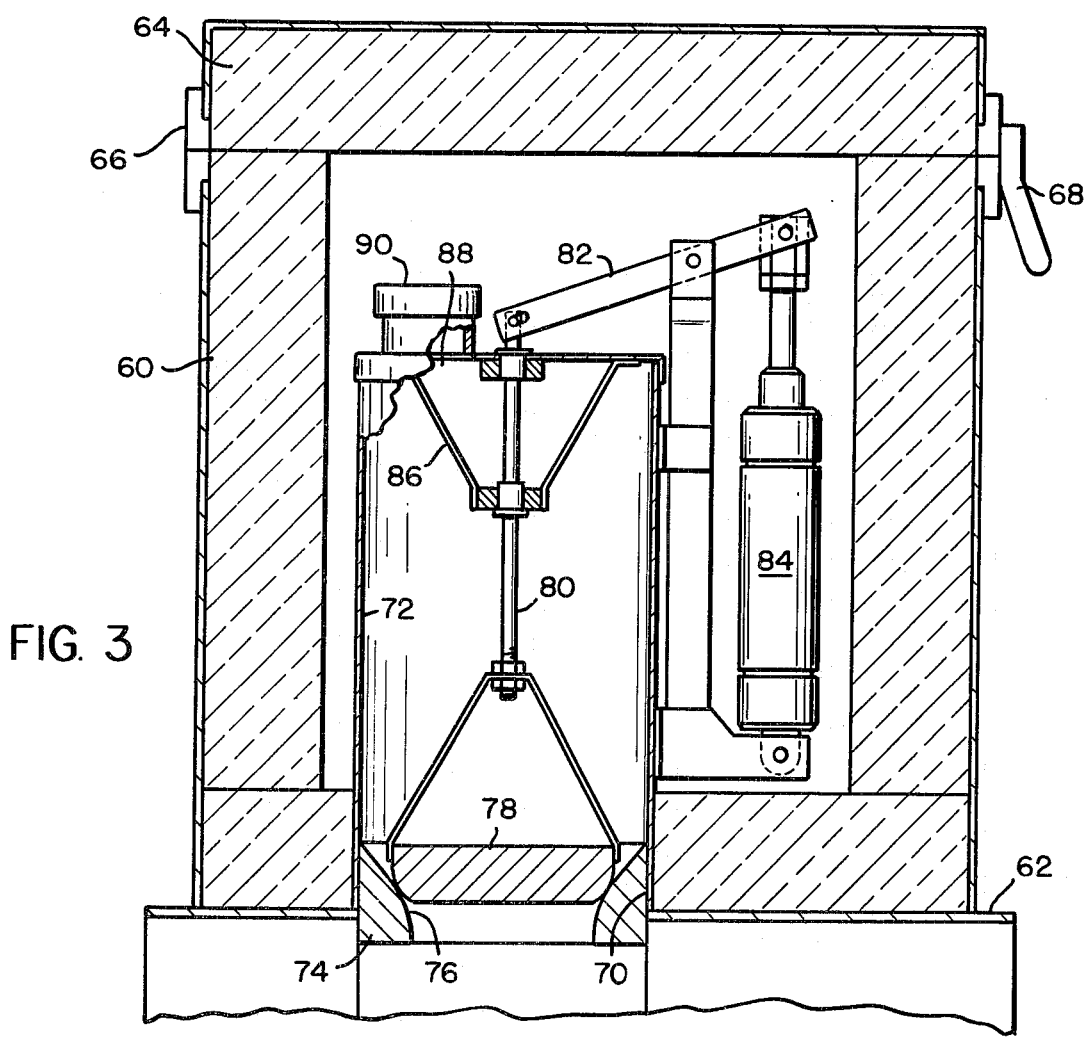
FIG. 3 is an elevation view showing another embodiment of the dispenser unit.

A modified version of the insulated compartment and dispenser is shown in FIGS. 3 and 4. In FIG. 3, the insulated compartment 60 can be connected to the cover of the roto-mold by clamping its flange 62 to the cover of the roto-mold. At the top of compartment 60 is an insulated cover 64 which is hinged at 66 to the compartment and which has a latch or other suitable lock mean 68 for maintaining the cover in a closed position as the roto-mold is rotated.

The bottom of the insulated compartment 60 has an opening 70 which communicates with an opening through the top of the roto-mold. Within the compartment is the dispenser 72. This dispenser extends down through opening 70 with the bottom 74 of the dispenser being provided with a discharge opening 76. A plunger 78 for sealing opening 76 is attached to a rod member 80 that extends up through the top of dispenser 72. The end of this rod is attached to one end of a simple lever 82, the other end of the lever being attached to the piston rod of an air cylinder 84. With this arrangement, the operation of the air cylinder will act to raise plunger 78 so as to open discharge opening 76.

Completing the structure of the discharge container is a spider 86 which helps support and guide rod 80, a charge inlet 88 at the top of the dispenser, and a cap member 90 for closing inlet 88.

As shown in FIG. 4, two dispensers 72 and 72' may be provided within the insulated compartment. Each of the dispensers may be selectively operated by its associated air cylinder 84 and 84'. With this arrangement, three separate layers may be deposited on the wall of the roto-mold to form the laminated structure. In such cases the first layer would be the least expensive resin, such as polypropylene or the like. The charge for forming the second layer would be a mixture of the inexpensive and more expensive resin, such as a 50-50 mixture of polypropylene and ethylene-chlorotrifluoroethylene, while the charge for forming the third layer would be made up entirely of the more expensive resin.

The operation of the embodiments shown in FIGS. 3 and 4 is essentially the same as that shown in FIG. 2 except, of course, that with a FIG. 3 embodiment, two additional layers can be deposited.

Thus, it should be appreciated that the present invention provides a method and apparatus for roto-molding multi-layered plastic containers without the need for removing the roto-mold from the furnace or interrupting the manufacturing cycle to add additional charges to the roto-mold. The present invention allows one or more successive layers to be formed by dispensing additional amounts of powdered resin into the mold while the mold is in the oven and without interrupting its heating cycle.

Having thus described the invention, what is claimed as new is:

1. Roto-molding apparatus comprising:
   (a) a hollow mold body of heat conducting material for receiving a charge of powdered resin to be roto-molded, said mold body having a removable cover with an opening therethrough;
   (b) a heat insulated compartment attached to the exterior of said mold cover, said compartment having an insulated base, upstanding side walls and top;
   (c) an upright dispenser for powdered resin fixed in said insulated compartment, said dispenser being in communication with the interior of said mold body through said compartment base and said opening;
   (d) seal means for selectively opening and closing the communication between said dispenser and the interior of said mold body; and
   (e) load means for loading a charge of powdered resin into said dispenser.

2. Roto-molding apparatus as in claim 1 wherein said load means comprises:
   (a) a lockable door member on said compartment top providing access to the interior of said compartment and said dispenser;
   (b) a removable lid on said upright dispenser providing access to the interior of said dispenser; and (c) bias means between said door member and lid for exerting a closing force on said removable lid when said door member is locked closed.

3. A roto-mold apparatus as in claim 1 wherein said dispenser has a lower necked portion extending down through said compartment base and into said opening, said seal means being located in said necked portion.

4. Roto-mold apparatus as in claim 3 wherein said seal means comprises:
(a) a sliding gate movable across said necked portion; and
(b) means for moving said gate.

5. Roto-mold apparatus as in claim 1 including a tubular member extending downward from about the periphery of said opening and into said hollow mold body.

6. Roto-mold apparatus as in claim 1 including air vibrating means fixed to the wall of said dispenser for shaking said dispenser to insure discharge of the powdered resin charge from said dispenser.

7. Roto-mold apparatus as in claim 1 wherein said removable mold cover has at least two openings therein; an upright dispenser in said insulated compartment communicating with the interior of said hollow mold body through each of said openings; and seal means for selectively opening and closing each communication between said dispensers and the interior of said mold body.

8. Roto-mold apparatus as in claim 1 wherein said seal means comprises:
(a) a plunger in said dispenser movable vertically between
  a first position wherein said plunger seals said communication and
  a second position wherein said communication is open to permit the powdered resin contents of said dispenser to fall by gravity into said hollow mold body;
(b) an upright rod member tied at its lower end to said plunger, the upper end of said rod extending upward through said dispenser; and
(c) means operatively connected to the upper end of said rod for moving the same vertically to open and close said communication.

9. Roto-molding apparatus comprising:
(a) a hollow mold body of heat conducting material for receiving a first charge of powdered resin;
(b) a removable cover for said mold body, said cover having an opening therethrough;
(c) a heat insulated compartment attached to the exterior of said cover, said compartment having a base, upstanding walls and a top made of a heat insulating material, said top having a door member and said base having a passage therethrough axially aligned with the opening in said mold cover;
(d) a dispenser container in said compartment for receiving a second charge of powdered resin, said dispenser having a discharge portion extending through said passage and said cover opening so as to put the interior of said dispenser in direct communication with the interior of said mold body; and
(e) means for selectively opening said discharge portion to permit powdered resin in said dispenser container to discharge into said mold body.

* * * * *